United States Patent [19]

Leuer

[11] Patent Number: 4,488,448
[45] Date of Patent: Dec. 18, 1984

[54] DECOUPLING DEVICE FOR GEARSHIFT LINKAGES

[75] Inventor: Karl-Rudi Leuer, Russelsheim, Fed. Rep. of Germany

[73] Assignee: General Motors Corporation, Detroit, Mich.

[21] Appl. No.: 472,746

[22] Filed: Mar. 7, 1983

[30] Foreign Application Priority Data

Apr. 14, 1982 [DE] Fed. Rep. of Germany ....... 3213662

[51] Int. Cl.$^3$ .............................................. G05G 9/18
[52] U.S. Cl. ..................................... 74/473 R; 74/470
[58] Field of Search ............. 74/524, 519, 523, 473 R, 74/470; 180/328, 89.14

[56] References Cited

U.S. PATENT DOCUMENTS

| | | | |
|---|---|---|---|
| 1,881,843 | 10/1932 | Morley | 74/473 R |
| 3,406,586 | 10/1968 | Hobbins | 74/473 P |
| 4,323,356 | 4/1982 | Stephenson | 74/473 R |

FOREIGN PATENT DOCUMENTS

| | | | |
|---|---|---|---|
| 2658019 | 7/1978 | Fed. Rep. of Germany | 74/473 R |
| 2270115 | 12/1975 | France | 180/89.14 |
| 178514 | 11/1982 | Japan | 74/470 |

*Primary Examiner*—Alexander Grosz
*Assistant Examiner*—Adrian H. Whitcomb, Jr.
*Attorney, Agent, or Firm*—Donald F. Scherer

[57] ABSTRACT

The decoupling device is used for connecting the rods, especially gearshift rods disposed between the transmission and the gearshift lever of a motor vehicle. The incorporation of the device into the gearshift linkage permits to and fro movement of the decoupled gearshift rod and suspends the rigid connection between the gearshift lever and the transmission after the transmission has been shifted into a gear. A form-locking connection between the two gearshift rods is only established at the time of selecting or shifting in and out of a gear. The suspension of the rigid connection between the gearshift lever and the transmission effected by the decoupling device eliminates the problem of gear-jumping.

The decoupling device incorporates a displaceable intermediate member adapted to control the decoupling operation, which is disposed between ends of the gearshift rods which are in engagement with one another and are located inside a tubular member. The intermediate member is supported on a blade disposed on one of the gearshift rods and is provided with a decoupling element which is cooperating with depressions in the blade and/or the channel of the gearshift rod for establishing a form-locking connection. Furthermore, the intermediate member is provided with locking means which engage with depressions provided in the tubular member surrounding the ends of the gearshift rods. It is also possible to provide coupling between the two gearshift rods that is of the force-locking type.

12 Claims, 3 Drawing Figures

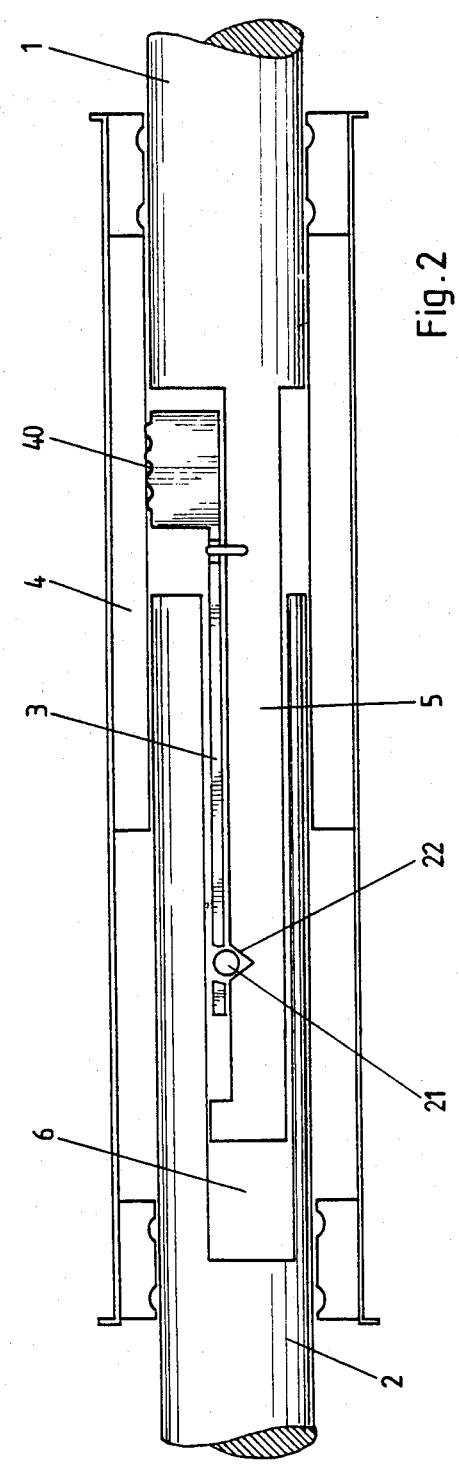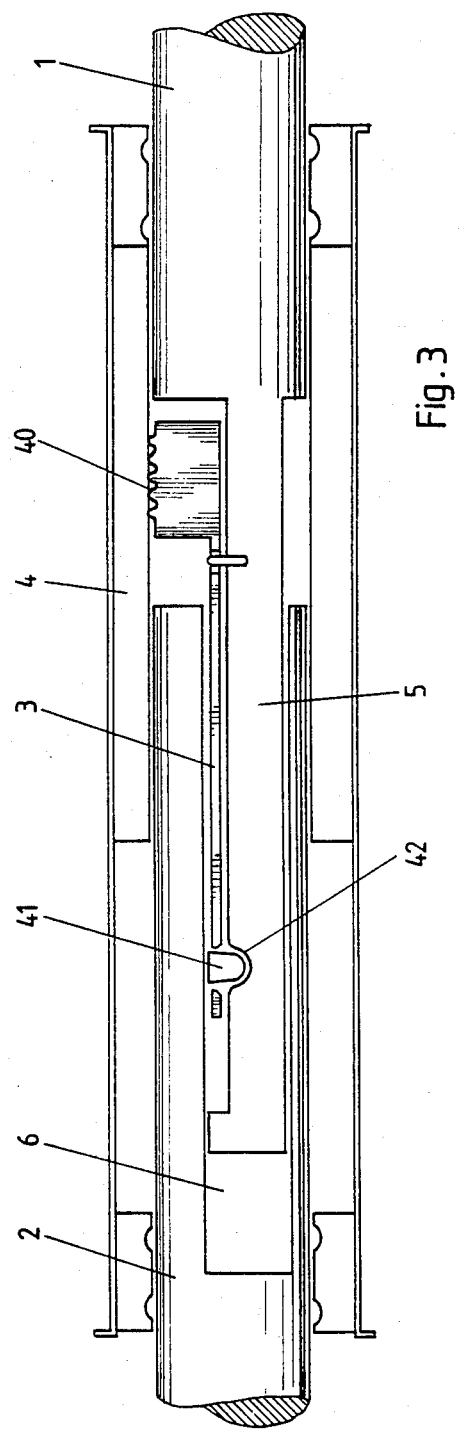

DECOUPLING DEVICE FOR GEARSHIFT LINKAGES

The invention is directed to a decoupling device for linkages, especially linkages disposed between the transmission and the gearshift lever of a motor vehicle, with the decoupling device being disposed between two gearshift rods and adapted to permit, after the transmission has been shifted into one of the gears, forward and backward movement of the decoupled gearshift rods.

Motor vehicles in which, for reasons for compactness, the engine/transmission unit is mounted transversely relative to the longitudinal axis of the vehicle, may on occasion have a problem due to gear jumping. Due to pavement-induced excitations and torque reactions generated by the engine, the engine/transmission unit is subjected to rotary movements about its longitudinal axis, and vibrations are generated in the gearshift linkage to the extent that the drive unit and the gearshift linkage are caused to vibrate against each other. If the amplitudes of the vibrations thus generated are large enough, it may happen that the transmission is thrown out of the gear that has just been put into mesh.

It is the object of the present invention to provide a compact decoupling device which is comprised of relatively few and simple individual components and which effectively eliminates the problem of gear jumping. This objective is achieved in accordance with the present invention in that a displaceable intermediate member, which controls the decoupling operation, is disposed between the ends of the gearshift rods that are in engagement with one another and which are mounted inside a tubular member.

The intermediate member according to the present invention renders the decoupling device relatively simple and compact in design and provides a high degree of operational safety. In addition, it affords economical manufacture and assembly as well as long life.

In a further advantageous development of the invention, the end of the one gearshift rod is provided with a blade which, in combination with the intermediate member, extends into a groove provided on the end of the other gearshift rod, so that when a gear is being selected, both gearshift rods are caused to rotate in unison. The rotary movement can also be transmitted by means of a pin which is mounted for displacement in a longitudinal slot, or by means of a sliding element. A decoupling element, which is transversely displaceable relative to the longitudinal axis of the intermediate member, may be inserted into the intermediate member mounted on the blade of the gearshift rod, and said decoupling element may be adapted to cooperate with depressions provided in the blade and/or with the groove in the gearshift rod so as to establish a form-locking connection. The intermediate member may be provided with a locking means located at the end of the intermediate member between the two gearshift rods which is engaging with depressions provided in the tubular casing surrounding the gearshift rods.

Instead of the form-locking coupling between the two gearshift rods, one could also employ a coupling of the force-locking type if the decoupling element and the intermediate member are being fashioned in conformity with such an arrangement. In this instance, the end of the intermediate member cooperating with the tubular member surrounding the ends of the gearshift rod would be in frictional engagement with the inner surface of the tubular member.

Other features and advantages will become apparent from the drawings and the accompanying specifications wherein:

FIG. 2 is another embodiment of the decoupling device, in which the intermediate member is provided with a friction surface and a spherical member so as to establish frictional engagement between the two gearshift rods; and FIG. 3 is a modification of the embodiment of FIG. 2 in which a wedging member is employed for the frictional engagement between the two gearshift rods.

Figure 1:
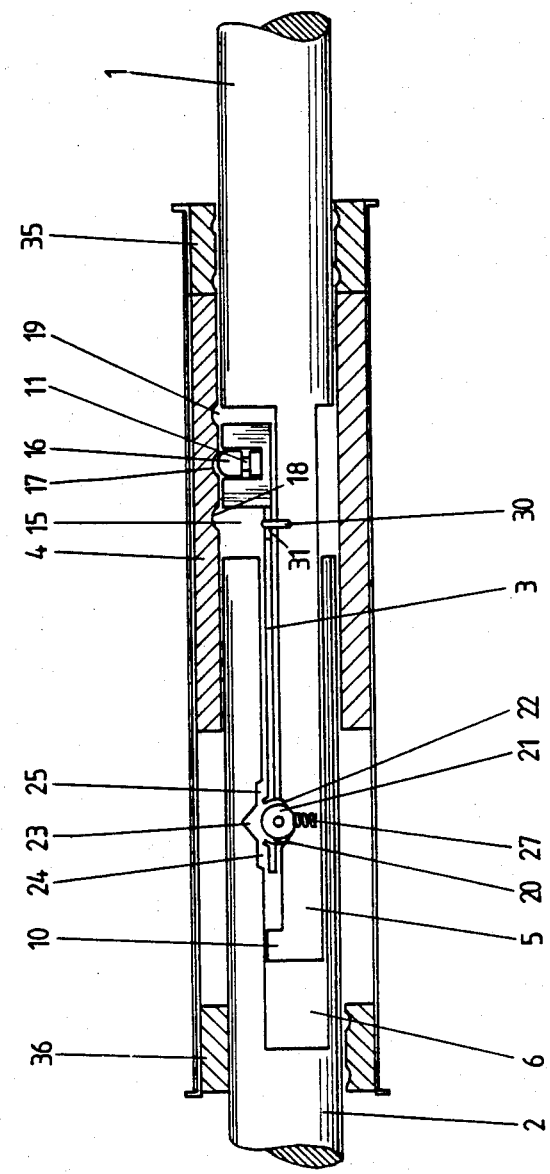
FIG. 1 is a decoupling device in which the intermediate member is provided with a locking means and with a spherical member which serves as a decoupling element, with the spherical member being shown in the decoupled position.

The decoupling device according to FIG. 1 is comprised of a gearshift rod 1 connected with the gearshift lever of the motor vehicle, not shown, a gearshift rod 2 connected with the transmission, not shown, an intermediate member 3 and a tubular member 4. The gearshift rod 1 is provided at its end with a blade 5 which engages with a channel 6 of the gearshift rod 2. The blade 5 is provided with a lug 10 which abuts at the inner wall of the channel 6 and which serves to transmit, in the coupled as well as in the decoupled state, rotary movement from the gearshift rod 1 to the gearshift rod 2. Such rotary movement can also be transmitted by means of a pin or a sliding element. In the area of the channel 6, the intermediate member 3 is mounted on the blade 5 and is adapted for axial displacement. One end of the intermediate member 3 is provided with a locking means 11, which is disposed in a space between the two gearshift rods 1 and 2, and whose locking or detent element 16 engages with depressions 17, 18 and 19 provided on the inner wwall of the tubular member 4. At the other end of the intermediate member 3, a ball or a roller 21 is positioned in a recess 20 which is cooperating with depressions 22 and 23 in the blade 5 and the channel 6, respectively. The depression 23 in the channel 6 is provided with lateral enlargements 24 and 25 which serve as a trapping means for the ball 21. A pin 30 inserted in the blade 5 engages with a longitudinal slot 31 of the intermediate member 3 in order to positively effect, if required, a connection between the gearshift rod 1 and the intermediate member 3. Bushings 35 and 36 are disposed in the ends of the tubular member 4 for supporting the gearshift rods 1 and 2, respectively.

When selecting a gear, the rotary movements are transmitted through blade 5 and channel 6 to the transmission. Shifting in and out of gear is effected by the axial displacement of the gearshift rod 1. During this process, the ball 21 emerges, since the intermediate member is initially retained by the locking element 16, somewhat out of the recess 22 and moves into the recess 23, so that a form-locking connection is established between the gearshift rods 1 and 2, and the gearshift rod 2 as well as the intermediate member 3 are caused to rotate together with gearshift rod 1 whereby, depending on the direction of shifting, the locking element 16 of the intermediate member 3 engages with one or the other of the two subsequent depressions 18 and 19 provided in the tubular member 4. The distance between the individual depressions 17, 18, 19 corresponds to the length of the shift path. At the end of the shifting movement, no forces are acting on the two gearshift rods 1, 2 and the two depressions 22, 23 are exactly aligned above one another, so that the ball or the roller 21 will move, either by the force of gravity or the force exerted by spring 27, into the depression 22, whereupon the decoupled state according to FIG. 1 is re-established. The gearshift rod 2 is then free to move to and fro without transmitting such movement to the gearshift rod 1 and the gearshift lever.

The embodiments according to FIGS. 2 and 3 differ from the one according to FIG. 1 in that the connection between the gearshift rods 1 and 2 during gearshifting is of the force-locking, rather than the form-locking type. Instead of the locking means 11 on the intermediate member 3, a friction surface 40 is provided, which is an frictional engagement with the inner surface of the tubular member 4. Due to the absence of the depressions 23, the ball 21, if it is urged out of the depression 22 during gearshifting, is also in frictional engagement with the inner wall of the channel 7. Instead of a ball or a roller according to FIG. 2, one may also use a wedging element 41, as shown in FIG. 3, whose lower rounded end engages with a rounded depression 42.

The gearshift rods 1 and 2 incorporating the blade 5 and channel 6, respectively, as well as the tubular member 4, according to FIG. 1, may also be of symmetrical configuration, so that two intermediate members 3 having balls 21 may act as oppositely disposed coupling elements.

The arrangements described in the foregoing text in conjunction with the drawings are merely intended as exemplary embodiments, but the concept of the invention is not limited to these embodiements. A great variety of modifications are possible in terms of design and arrangement of the individual components of the decoupling device without departing from the overall concept of the invention.

The embodiments of the invention in which an exclusive property or privilege is claimed are defined as follows:

1. Decoupling device for linkages, especially linkages of the type disposed between the transmission and the gearshift lever of motor vehicles, said decoupling device being disposed between two gearshift rods and adapted to permit, after the transmission has been shifted into one of the gears, forward and backward movement of the decoupled gearshift rod, the improvement comprising: a tubular member housing said two gearshift rods; and an axially displaceable intermediate member, for controlling the decoupling operation, being operatively disposed between the gearshift rods which are in engagement with one another and also being mounted in said tubular member.

2. Decoupling device according to claim 1, the improvement comprising: the end of one of the gearshift rods being provided with a blade which, together with the intermediate member, extends into a groove at the end of the other gearshift rod so that when a gear is being selected, both gearshift rods are enabled to rotate in unison.

3. Decoupling device according to claim 2, the improvement comprising: a decoupling element, which is transversely displaceable relative to the longitudinal axis of the intermediate member mounted on said blade of the gearshift rod, being inserted into said intermediate member, and said decoupling element cooperating with depressions provided in the blade and/or the groove of the gearshift rods so as to establish a form-locking connection.

4. Decoupling device according to claim 3, the improvement comprising: the depression in the blade and/or the groove having lateral enlargements which act as a catch means for the decoupling element.

5. Decoupling device according to claim 1, the improvement comprising: the intermediate member being provided with an arresting means which is disposed between the two gearshift rods and which engages with a plurality of depressions of the tubular coupling member surrounding the ends of the gearshift rods.

6. Decoupling device according to claim 5, the improvement comprising: the distance between the depressions in the tubular coupling member corresponding to the distance of the shifting path travelled by the gearshift rods.

7. Decoupling device according to claim 1, the improvement comprising: a pin, which is inserted into the blade connected with gearshift rod associated with the gearshift lever, extending into a longitudinal slot of the intermediate member so as to effect positive coupling between the gearshift rod and the intermediate member.

8. Decoupling device according to claim 1, the improvement comprising: the decoupling element being in the form of a spherical element or a roller.

9. Decoupling device according to claim 1, the improvement comprising: the coupling between the two gearshift rods being effected by force-locking means.

10. Decoupling device according to claim 9, the improvement comprising: the end of the intermeidate member cooperating with the tubular coupling surrounding the ends of gearshift rods being in frictional engagement with the inner surface of the tubular coupling.

11. Decoupling device according to claim 9, the improvement comprising: the decoupling device being in the form of a wedging element.

12. A linkage for use in shifting a power gear transmission comprising; a shift lever; an input link connected to said shift lever including an axially extending tongue member; an output link extending coaxially with said input link and including an internal groove means adapted to accept said tongue member; housing means enclosing an axially extending portion of said input link including said tongue member; an intermediate member disposed for relative motion between said tongue member and said groove means; first engaging means on said intermediate member between said input and output links for permitting relative axial movement therebetween during gear engagement; and second engaging means coacting between said intermediate member and said housing means for causing relative movement between said intermediate member and said input member for enforcing engagement of said first engaging means when said input link is moved by said shift lever axially relative to said housing means to thereby provide unitary axial movement of said input and output links during gear ratio changes.

* * * * *